Patented Aug. 9, 1932

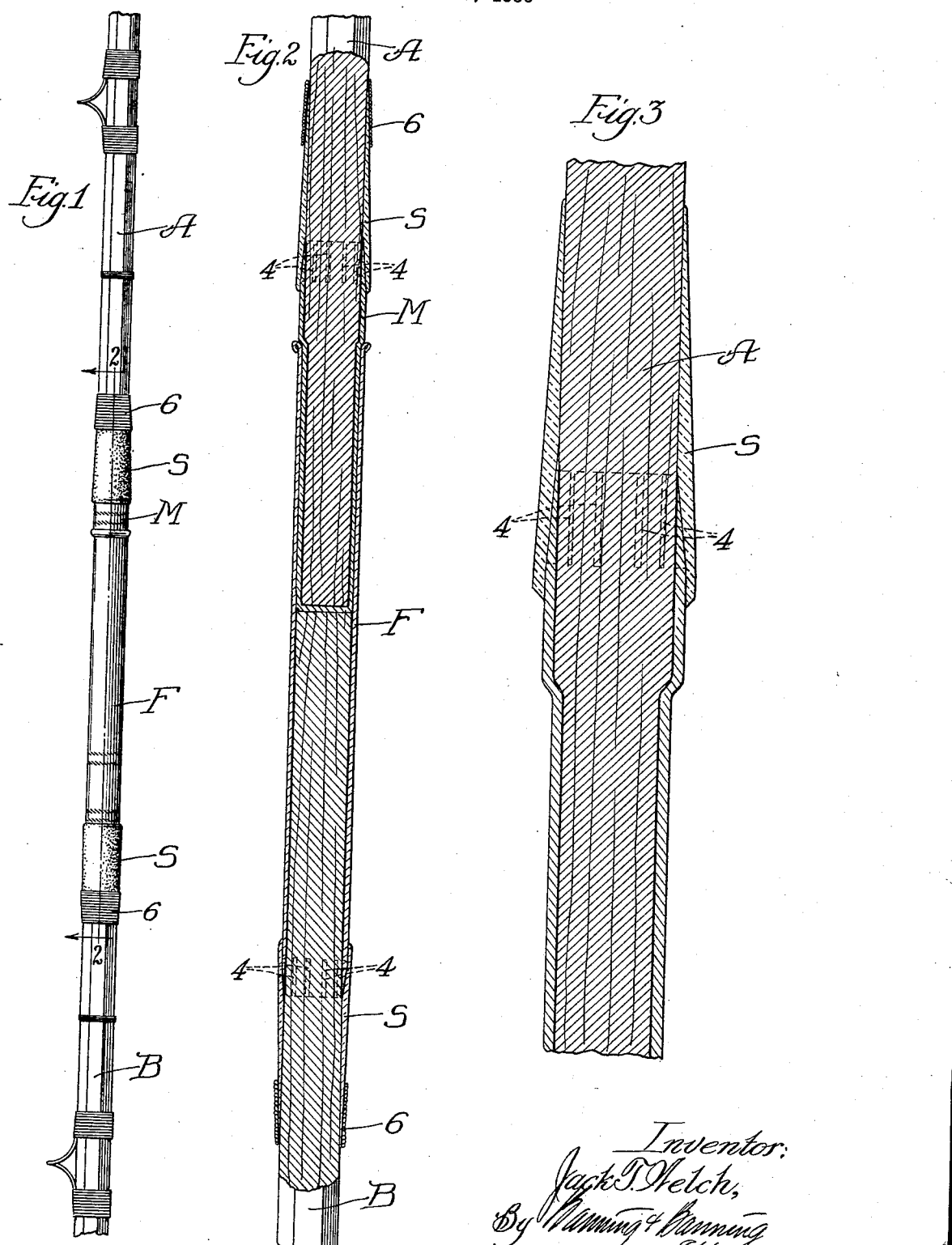

1,870,976

UNITED STATES PATENT OFFICE

JACK T. WELCH, OF DOWAGIAC, MICHIGAN, ASSIGNOR TO JAMES HEDDON'S SONS, OF DOWAGIAC, MICHIGAN, A CORPORATION OF MICHIGAN

FISHING ROD

Application filed December 29, 1930. Serial No. 505,314.

This invention relates to a jointed fishing rod having its sections releasably connected with the aid of telescoping ferrules applied to the ends thereof, and is concerned primarily with means for effecting reinforcement at the point where such a connecting ferrule joins to a rod section.

In the use of a jointed fishing rod, whether the same be made of bamboo, wood, metal, or other material, it is commonly found that the weakest place where breakage is most apt to occur is close to the ends of the ferrules which are applied to the joined rod sections. If the rod splits or breaks, as sometimes happens under stress, the owner's misfortune will, in all probability, be aggravated by loss of the fish whose struggles may have occasioned the mishap. A sportsman, in particular, demands a high grade rod having both a considerable flexibility and adequate strength, and is easily dissatisfied if deficient in either respect. It is with a view to strengthening the rod in its weakest places, that it is adjacent the ferrules at the joints, that the present invention has been devised.

In the accompanying drawing is illustrated a suggestive exemplification of my invention in the manner following:

Figure 1 is a view in elevation of a portion of a jointed fishing rod showing the connected ends of two adjacent sections thereof;

Fig. 2 is an enlarged fragmentary section on line 2—2 of Fig. 1; and

Fig. 3 is a further enlarged fragmentary longitudinal section showing the application of a reinforcing sleeve over the end of one ferrule and the adjacent portion of the rod section.

The illustrated portions of a conventional jointed rod comprise sections A and B which may be made of bamboo, wood, metal, or other suitable material. Fitted over one end of the rod section B is a ferrule F extending beyond the rod end to form a socket wherein may be received the male ferrule M which is applied over the adjoining end of the rod section A. Each ferrule may be tightly secured to its associated rod section in the usual way, as by cement or a cross pin (not shown).

The ferrule ends which are remote from each other are desirably, although not necessarily, tapered down toward the surface of the rod sections whereon they are mounted. Also, as is common practice, the ferrules may be serrated by the provision of longitudinal slots 4 at their tapered ends, thereby forming relatively flexible tongues at the ends of the ferrules. It has been found that such a construction tends to greater strength in the zone of each ferrule where breakage is most apt to occur.

Although numerous expedients have been adopted to strengthen the rod in the region of each ferrule end, a weakness at such points still persists. Under stress, the rod will flex, as is intended, but at the juncture of the ferrules with the ends of the rod sections, this flexation is hampered. To strengthen the rod at such points, I apply thereto sleeves S which are fitted closely over the rod and slid into position over the ends of the ferrules that are mounted thereupon.

The sleeve construction which I have found entirely suitable for the purposes of this invention is desirably made of some such material as has a cellulose base—pyralin, for example. As shown in the drawing, one end of the sleeve is required to ride over the end of the associated ferrule for a slight distance, and in doing so it becomes firmly positioned in place. If desired, circumferential windings 6 of silk or other material, such as commonly surround a fishing rod, may be applied over each sleeve at one point to assist in securing it in position. By so shaping the sleeve that one or both ends are tapered down close to the associated parts, as suggested in the drawing, it will present a smooth and inconspicuous appearance.

There is a particular advantage resulting from the use of a reinforcing sleeve having a cellulose base with a rod made of bamboo, wood, or fibre, such as is commonly used by sportsmen. Bamboo, in particular, is a material which tends to dry and shrink with age. A metallic ferrule applied to a rod section of such material tends in consequence to loosen its connection therewith as the rod shrinks. A sleeve of the kind specified applied over both the rod and ferrule tends also to shrink with age, thereby maintaining its secure anchorage with each. In securing the sleeve in place, it may be desirable to render the sleeve plastic by the application thereto of a proper solvent, such as amylacetate, thereby conducing to a firm adhesion between the sleeve and both the rod and ferrule. The sleeve so applied is posessed of sufficient flexibility to give as required when the rod is flexed, and so is admirably adapted as a joint reinforcement.

It will be apparent from the preceding description that my invention provides not only a reinforcement at the joint between a ferrule and rod section, but also a means for enhancing the secure connection of the ferrule to the rod. The likelihood of rod breakage, when the reinforcing means of this invention is used, is considerably reduced, and this result is attained without in any degree impairing the flexibility of the rod.

I claim:

1. A fishing rod comprising joined sections having their connected ends mounting telescoping ferrules the remote ends whereof are tapered down to a diameter closely approximating that of the associated rod, and contractable reinforcing sleeves of flexible material applied closely over the tapered ferrule ends and adjacent portions of the rod.

2. A fishing rod comprising connectible sections mounting telescoping ferrules on their ends to be joined, each ferrule extending back along a rod section for a desired distance, and a durably contractible reinforcing flexible sleeve having a continuous surface shrunk over the joint at the juncture of each ferrule with an associated rod section.

3. A fishing rod having a flexible section mounting at one end a ferrule which extends back along the rod section a desired distance, and an integral durably contractible flexible sleeve having a continuous surface united to both the ferrule and rod section and covering the joint therebetween.

4. A fishing rod comprising joined sections having their connected ends mounting telescoping ferrules the walls whereof are rendered flexible in one portion, and an integral reinforcing durably contractible sleeve of flexible material having a continuous surface applied closely over the flexible portion of the ferrule and adjacent portion of the rod.

5. A fishing rod in which is comprised a flexible section to be joined to others, a ferrule applied over and secured to one end of the section, and a sleeve having a cellulose base applied over and secured to both the ferrule and rod section in their joinder zone.

6. A fishing rod having an exterior fitting over part of which is arranged a durably self-contracting flexible sleeve having a continuous surface applied circumferentially to the rod.

7. A fishing rod having a shrinkable body upon the surface of which is mounted a metallic fitting over part of which is arranged a sleeve applied circumferentially to the rod, the sleeve being formed of a contractible material to maintain a tight connection with the rod as it shrinks.

JACK T. WELCH.